United States Patent
Chang et al.

(10) Patent No.: US 7,656,907 B2
(45) Date of Patent: *Feb. 2, 2010

(54) METHOD AND APPARATUS FOR REDUCING CLOCK SPEED AND POWER CONSUMPTION

(75) Inventors: Michael Chang, San Jose, CA (US); Michael A. Sokol, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 11/889,741

(22) Filed: Aug. 16, 2007

(65) Prior Publication Data

US 2007/0286223 A1    Dec. 13, 2007

Related U.S. Application Data

(63) Continuation of application No. 09/858,505, filed on May 17, 2001, now Pat. No. 7,274,705.

(60) Provisional application No. 60/241,332, filed on Oct. 19, 2000, provisional application No. 60/237,764, filed on Oct. 3, 2000.

(51) Int. Cl.
   *H04L 7/00*       (2006.01)
   *G06F 1/12*       (2006.01)
(52) U.S. Cl. .................. 370/503; 370/429; 713/400
(58) Field of Classification Search ............... 370/357, 370/360, 373, 386, 412, 413, 428, 429, 503; 713/322, 400, 401
   See application file for complete search history.

(56) References Cited

U.S. PATENT DOCUMENTS

| 5,126,598 | A | 6/1992 | Kotani |
| 5,278,789 | A | 1/1994 | Inoue et al. |
| 5,390,173 | A | 2/1995 | Spinney et al. |
| 5,414,704 | A | 5/1995 | Spinney |

(Continued)

FOREIGN PATENT DOCUMENTS

EP    0312917 A2    4/1989

(Continued)

OTHER PUBLICATIONS

"A High-Speed CMOS Circuit for 1.2-Gb/s 16×16 ATM Switching," Alain Chemarin et al. 8107 IEEE Journal of Solid-State Circuits 27 Jul. 1992 No. 7, New York, US, pp. 1116-1120.

(Continued)

*Primary Examiner*—Chi H Pham
*Assistant Examiner*—Ahmed Elallam

(57)    ABSTRACT

A system for reducing clock speed and power consumption in a network chip is provided. The system can have a core that transmits and receives signals at a first clock speed. A receive buffer can be in communication with the core and be configured to transmit the signals to the core at the first clock speed. A transmit buffer can be in communication with the core and configured to receive signals from the core at the first clock speed. A sync can be configured to receive signals in the receive buffer at a second clock speed and to transmit the signals from the transmit buffer at the second clock speed. The sync can be in communication with the transmit buffer and the receive buffer.

20 Claims, 8 Drawing Sheets

U.S. PATENT DOCUMENTS

| | | |
|---|---|---|
| 5,423,015 A | 6/1995 | Chung |
| 5,448,715 A | 9/1995 | Lelm et al. |
| 5,459,717 A | 10/1995 | Mullan et al. |
| 5,473,607 A | 12/1995 | Hausman et al. |
| 5,499,295 A | 3/1996 | Cooper |
| 5,524,254 A | 6/1996 | Morgan et al. |
| 5,555,398 A | 9/1996 | Raman |
| 5,568,477 A | 10/1996 | Galand et al. |
| 5,579,301 A | 11/1996 | Ganson et al. |
| 5,644,784 A | 7/1997 | Peek |
| 5,652,579 A | 7/1997 | Yamada et al. |
| 5,696,899 A | 12/1997 | Kalwitz |
| 5,734,927 A | 3/1998 | Boutaud et al. |
| 5,742,613 A | 4/1998 | MacDonald |
| 5,748,631 A | 5/1998 | Bergantino et al. |
| 5,754,540 A | 5/1998 | Liu et al. |
| 5,781,549 A | 7/1998 | Dai |
| 5,787,084 A | 7/1998 | Hoang et al. |
| 5,790,539 A | 8/1998 | Chao et al. |
| 5,802,052 A | 9/1998 | Venkataraman |
| 5,802,287 A | 9/1998 | Rostoker et al. |
| 5,825,772 A | 10/1998 | Dobbins et al. |
| 5,826,092 A | 10/1998 | Flannery |
| 5,828,653 A | 10/1998 | Goss |
| 5,831,980 A | 11/1998 | Varma et al. |
| 5,842,038 A | 11/1998 | Williams et al. |
| 5,845,081 A | 12/1998 | Rangarajan et al. |
| 5,884,099 A | 3/1999 | Klingelhofer |
| 5,887,187 A | 3/1999 | Rostoker et al. |
| 5,892,922 A | 4/1999 | Lorenz |
| 5,898,687 A | 4/1999 | Harriman et al. |
| 5,909,686 A | 6/1999 | Muller et al. |
| 5,918,074 A | 6/1999 | Wright et al. |
| 5,940,596 A | 8/1999 | Rajan et al. |
| 5,951,635 A | 9/1999 | Kamgar |
| 5,987,507 A | 11/1999 | Creedon et al. |
| 6,011,795 A | 1/2000 | Varghese et al. |
| 6,041,053 A | 3/2000 | Douceur et al. |
| 6,061,351 A | 5/2000 | Erimli et al. |
| 6,084,856 A | 7/2000 | Simmons et al. |
| 6,119,196 A | 9/2000 | Muller et al. |
| 6,145,100 A | 11/2000 | Madduri |
| 6,175,902 B1 | 1/2001 | Runaldue et al. |
| 6,185,185 B1 | 2/2001 | Bass et al. |
| 6,317,442 B1 | 11/2001 | Ngai |
| 6,546,451 B1 | 4/2003 | Venkataraman et al. |
| 6,597,693 B1 | 7/2003 | Leung |
| 7,100,020 B1 | 8/2006 | Brightman et al. |
| 2004/0136711 A1 | 7/2004 | Finan et al. |

FOREIGN PATENT DOCUMENTS

| | | |
|---|---|---|
| EP | 0465090 A1 | 1/1992 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 0907300 A2 | 4/1999 |
| EP | 0978968 A2 | 2/2000 |
| EP | 0978968 | 4/2003 |
| FR | 2 725 573 A1 | 4/1996 |
| JP | 4-189023 | 7/1992 |
| WO | WO 98/09473 | 3/1998 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | WO9900936 A1 | 6/2001 |

OTHER PUBLICATIONS

"Local Area Network Switch Frame Lookup Technique for Increased Speed and Flexibility," 700 IBM Technical Disclosure Bulletin 38 Jul. 1995, No. 7, Armonk, NY, US, pp. 221-222.

"Queue Management for Shared Buffer and Shared Multi-buffer ATM Switches," Yu-Sheng Lin et al., Department of Electronics Engineering & Institute of Electronics, National Chiao Tung University, Hsinchu, Taiwan, R.O.C., Mar. 24, 1996, pp. 688-695.

"A 622-Mb/s 8×8 ATM Switch Chip Set with Shared Multibuffer Architecture," Harufusa Kondoh et al., 8107 IEEE Journal of Solid-State Circuits 28 Jul. 1993, No. 7, New York, US, pp. 808-814.

"Catalyst 8500 CSR Architecture," White Paper XP-002151999, Cisco Systems Inc. 1998, pp. 1-19.

"Computer Networks," A.S. Tanenbaum, Prentice-Hall Int., USA, XP-002147300(1998), Sec. 5.2-Sec. 5.3, pp. 309-320.

METHOD AND APPARATUS FOR REDUCING CLOCK SPEED AND POWER CONSUMPTION

CROSS REFERENCE TO RELATED APPLICATIONS

This application is a Continuation of application Ser. No. 09/858,505 filed on May 17, 2001, now U.S. Pat. No. 7,274, 705, and claims priority to U.S. Provisional Patent Application 60/237,764, filed Oct. 3, 2000, U.S. Provisional Patent Application Ser. No. 60/241,332, filed on Oct. 19, 2000. The contents of these applications are hereby incorporated by reference in their entirety.

BACKGROUND OF THE INVENTION

1. Field of the Invention

The invention relates to a method and apparatus for high performance switching in local area communications networks such as token ring, ATM, ethernet, fast ethernet, and gigabit ethernet environments, generally known as LANs. The invention is also applicable to wide area networks, and virtually any computer network. In particular, the invention relates to a new switching architecture geared to power efficient and cost sensitive markets, and which can be implemented on a semiconductor substrate such as a silicon chip.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and Ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Basic Ethernet wirespeed is up to 10 megabits per second, and Fast Ethernet is up to 100 megabits per second. A gigabit Ethernet is capable of transmitting data over a network at a rate of up to 1,000 megabits per second. As speed has increased, design constraints and design requirements have become more and more complex with respect to following appropriate design and protocol rules and providing a low cost, commercially viable solution.

Referring to the OSI 7-layer reference model discussed previously, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, can forward packets based upon the destination network address. Layer three switches are capable of learning addresses and maintaining tables thereof which correspond to port mappings. Processing speed for layer three switches can be improved by utilizing specialized high performance hardware, and off loading the host CPU so that instruction decisions do not delay packet forwarding.

SUMMARY OF THE INVENTION

The invention is directed to a method and apparatus for reducing clock speed and power consumption in a network chip.

In one embodiment, the invention is a system having a core that transmits and receives signals at a first clock speed. A receive buffer is in communication with the core and configured to transmit the signals to the core at the first clock speed. A transmit buffer is in communication with the core and configured to receive signals from the core at the first clock speed. A sync is configured to receive signals in the receive buffer at a second clock speed and to transmit the signals from the transmit buffer at the second clock speed. The sync is in communication with the transmit buffer and the receive buffer.

In another embodiment, the invention is a method for synching two clock speeds. The method includes the steps of receiving a signal in a receive buffer at a first clock speed using a sync, then transmitting the signal from the receive buffer to a core at a second clock speed; transmitting the signal from the core to a transmit buffer at the second clock speed; and transmitting the signal from the transmit buffer at the first clock speed using a sync.

Another embodiment of the invention is a system for syncing two clock speeds. The system has a signal receiving means for receiving a signal in a receive buffer at a first clock speed using a sync. A core transmitting means transmits the signal from the receive buffer to a core at a second clock speed. A transmit buffer transmits the signal from the core to a transmit buffer at the second clock speed, and a processor transmitting means transmits the signal from the transmit buffer at the first clock speed using the sync.

BRIEF DESCRIPTION OF THE DRAWINGS

The objects and features of the invention will be more readily understood with reference to the following description and the attached drawings, wherein.

DETAILED DESCRIPTION OF THE INVENTION

Figure 1:
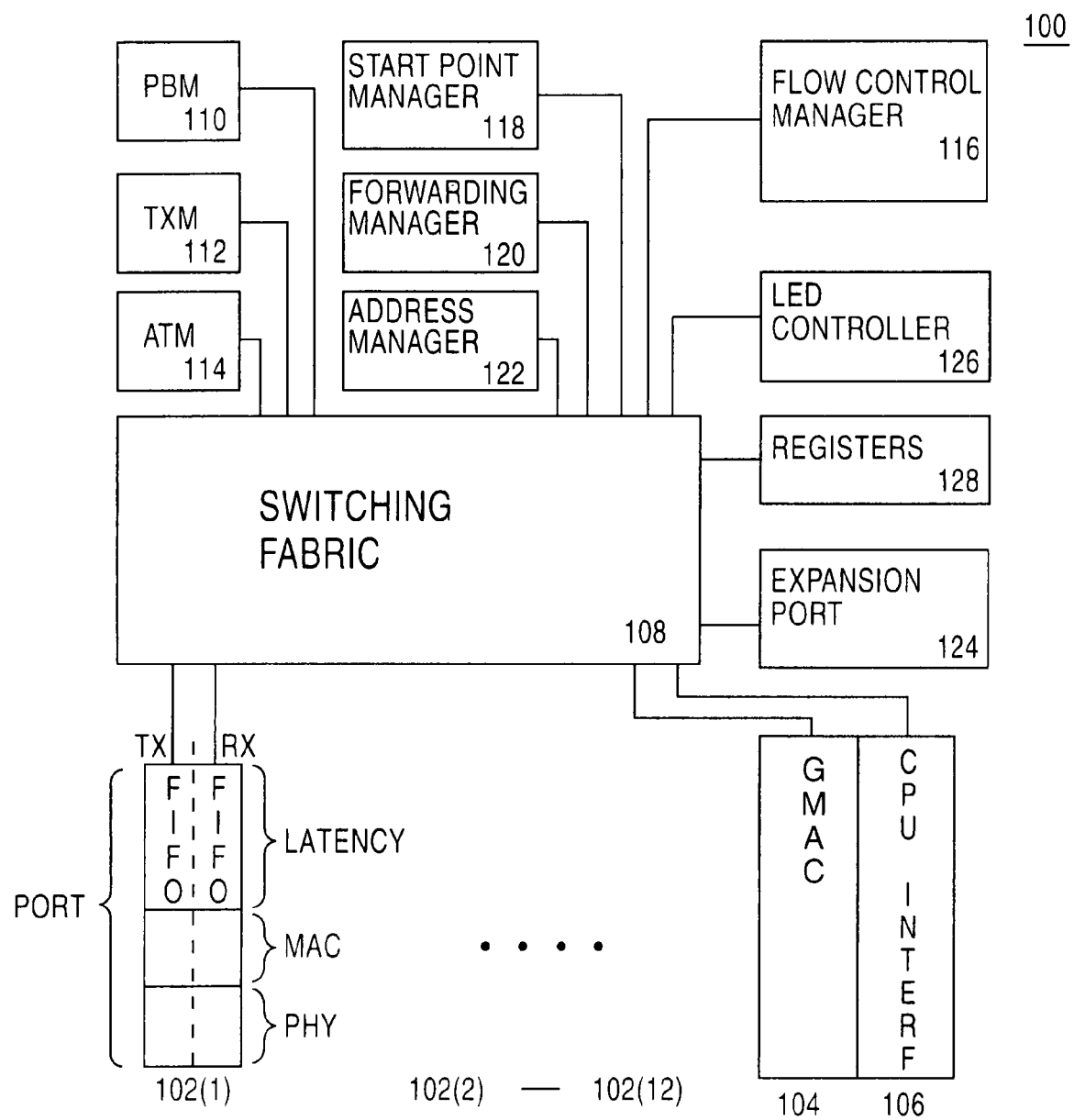
FIG. 1 is a general block diagram of elements of the present invention.

FIG. 1 is an example of a block diagram of a switch 100 of the present invention. In this example, switch 100 has 12 ports, 102(1)-102(12), which can be fully integrated IEEE compliant ports. Each of these 12 ports 102(1)-102(12) can be 10BASE-T/100BASE-TX/FX ports each having a physical element (PHY), which can be compliant with IEEE standards. Each of the ports 102(1)-102(12), in one example of the invention, has a port speed that can be forced to a particular configuration or set so that auto-negotiation will determine the optimal speed for each port independently. Each PHY of each of the ports can be connected to a twisted-pair interface using TXOP/N and RXIP/N as transmit and receive protocols, or a fiber interface using FXOP/N and FXIP/N as transmit and receive protocols.

Each of the ports 102(1)-102(12) has a Media Access Controller (MAC) connected to each corresponding PHY. In one example of the invention, each MAC is a fully compliant IEEE 802.3 MAC. Each MAC can operate at 10 Mbps or 100 Mbps and supports both a full-duplex mode, which allows for data transmission and reception simultaneously, and a half duplex mode, which allows data to be either transmitted or received, but not both at the same time.

Flow control can be provided by each of the MACs. When flow control is implemented, the flow of incoming data packets is managed or controlled to reduce the chances of system resources being exhausted. Although the present embodiment can be a non-blocking, wire speed switch, the memory space available may limit data transmission speeds. For example, during periods of packet flooding (i.e. packet broadcast storms), the available memory can be exhausted rather quickly. In order to enhance the operability of the switch in these types of situations, the present invention can implement two different types of flow control. In full-duplex mode, the present invention can, for example, implement the IEEE 802.3x flow control. In half-duplex mode, the present invention can implement a collision backpressure scheme.

In one example of the present invention each port has a latency block connected to the MAC. Each of the latency blocks has transmit and receive FIFOs which provide an interface to main packet memory. In this example, if a packet does not successfully transmit from one port to another port within a preset time, the packet will be dropped from the transmit queue.

In addition to ports 102(1)-102(12), a gigabit interface 104 can be provided on switch 100. Gigabit interface 104 can support a Gigabit Media—Independent Interface (GMII) and a Ten Bit Interface (TBI). The GMII can be fully compliant to IEEE 802.3ab. The GMII can pass data at a rate of 8 bits every 8 ns resulting in a throughput of 2 Gbps including both transmit and receive data. In addition to the GMII, gigabit interface 104 can be configured to be a TBI, which is compatible with many industry standard fiber drivers. Since in some embodiments of the invention the MDIO/MDC interfaces (optical interfaces) are not supported, the gigabit PHY (physical layer) is set into the proper mode by the system designer.

Gigabit interface 104, like ports 102(1)-102(12), has a PHY, a Gigabit Media Access Controller (GMAC) and a latency block. The GMAC can be a fully compliant IEEE 802.3z MAC operating at 1 Gbps full-duplex only and can connect to a fully compliant GMII or TBI interface through the PHY. In this example, GMAC 108 provides full-duplex flow control mechanisms and a low cost stacking solution for either twisted pair or TBI mode using in-band signaling for management. This low cost stacking solution allows for a ring structure to connect each switch utilizing only one gigabit port.

A CPU interface 106 is provided on switch 100. In one example of the present invention, CPU interface 106 is an asynchronous 8 or 16 bit 110 device interface. Through this interface a CPU can read internal registers, receive packets, transmit packets and allow for interrupts. CPU interface 106 also allows for a Spanning Tree Protocol to be implemented. In one example of the present invention, a chip select pin is available allowing a single CPU to control two switches. In this example, an interrupt pin, when driven low (i.e., driven to the active state) requiring a pull-up resistor, will allow multiple switches to be controlled by a single CPU.

A switching fabric 108 is also located on switch 100 in one example of the present invention. Switching fabric 108 can allow for full wire speed operation of all ports. A hybrid or virtual shared memory approach can also be implemented to minimize bandwidth and memory requirements. This architecture allows for efficient and low latency transfer of packets through the switch and also supports address learning and aging features, VLAN, port trunking and port mirroring.

Memory interfaces 110, 112 and 114 can be located on switch 100 and allow for the separation of data and control information. Packet buffer memory interface (PBM) 110 handles packet data storage while the transmit queue memory interface (TXM) 112 keeps a list of packets to be transmitted and address table/control memory interface (ATM) 114 handles the address table and header information. Each of these interfaces can use memory such as SRAM that can be configured in various total amounts and chip sizes.

PBM 110 is located on switch 100 and can have an external packet buffer memory (not shown) that is used to store the packet during switching operations. In one example of the invention, packet buffer memory is made up of multiple 256 byte buffers. Therefore, one packet may span several buffers within memory. This structure allows for efficient memory usage and minimizes bandwidth overhead. The packet buffer memory can be configurable so that up to 4 Mbytes of memory per chip can be used for a total of 8 Mbytes per 24+2 ports. In this example, efficient memory usage is maintained by allocating 256 byte blocks, which allows storage for up to 32K packets. PBM 110 can be 64 bits wide and can use either a 64 bit wide memory or two 32 bit wide memories and can run at 100 MHz.

TXM 112 is located on switch 100 and can have an external transmit queue memory (not shown). TXM 112, in this example, maintains 4 priority queues per port and allows for 64K packets per chip and up to 128K packets per system. TXM 112 can run at a speed of up to 100 MHz.

ATM 114 can be located on switch 100 and can have an external address table/control memory (not shown) used to store the address table and header information corresponding to each 256 byte section of PBM 110. Address table/control memory allows up to 16K unique unicast addresses. The remaining available memory is used for control information. ATM 114, in this example, runs up to 133 MHz.

Switch 100, in one example of the invention, has a Flow Control Manager 116 that manages the flow of packet data. As each port sends more and more data to the switch, Flow Control Manager 116 can monitor the amount of memory being used by each port 102(1)-102(12) of switch 100 and the switch as a whole. In this example, if one of the ports 102(1)-102(12) or the switch as a whole is using up too much memory as is predetermined by a register setting predefined by the manufacturer or by a user, Flow Control Manager 116 will issue commands over the ATM Bus requesting the port or switch to slow down and may eventually drop packets if necessary.

In addition to Flow control manager 116, switch 100 also has a Start Point Manager (SPM) 118 connected to Switching Fabric 108, a Forwarding Manager (FM) 120 connected to Switching Fabric 108 and an Address Manager (AM) 122 connected to Switching Fabric 108.

Start Point Manager (SPM) 118, through Switching Fabric 108 in one example of the present invention, keeps track of which blocks of memory in PBM 110 are being used and which blocks of memory are free.

Forwarding Manager 120 can, for example, forward packet data through Switching Fabric 108 to appropriate ports for transmission.

Address Manager (AM) 122 can, through Switching Fabric 108, manage the address table including learning source addresses, assigning headers to packets and keeping track of these addresses. In one example of the invention, AM 122 uses aging to remove addresses from the address table that have not been used for a specified time period or after a sequence of events.

An expansion port 124 can also be provided on switch 100 to connect two switches together. This will allow for full wire speed operation on twenty-five 100M ports (includes one CPU port) and two gigabit ports. The expansion port 124, in this example, allows for 4.6 Gbps of data to be transmitted between switches.

An LED controller 126 can also be provided on switch 100. LED controller 126 activates appropriate LEDs or other suitable indicator to give a user necessary status information. Each port of the ports 102(1)-102(12), in one example of the invention, has 4 separate LEDs, which provide per port status information. The LEDs are fully programmable and are made up of port LEDs and other LEDs. Each LED can include a default state for each of the four port LEDs. An example of the default operation of each of the port LEDs are shown below.

| LED | DEFAULT OPERATION |
| --- | --- |
| 0 | Speed Indicator<br>OFF = 10 Mbps or no link<br>ON = 100 Mbps |
| 1 | Full/Half/Collision Duplex<br>OFF = The port is in half duplex or no link<br>BLINK = The port is in half duplex and a collision has occurred<br>ON = The port is in full duplex |
| 2 | Link/Activity Indicator<br>OFF = Indicates that the port does not have link<br>BLINK = Link is present and receive or transmit activity is occurring on the media<br>ON = Link present without activity |
| 3 | Alert Condition<br>OFF = No alert conditions, port is operating normally<br>ON = The port has detected an isolate condition |

In addition to the default operations for the port LEDs, each of the port LEDs can be programmed through registers. These registers can be set up, in one example of the invention, by a CPU. By having programmable registers that control LEDs, full customization of the system architecture can be realized including the programmability of the blink rate.

Each of the LEDs can have a table, as shown below, associated with the LED, where register bits $R_{Ax}$, $R_{Bx}$ and $R_{Cx}$ can be set to provide a wide range of information.

For example, register bits $R_{Ax}$, $R_{Bx}$ and $R_{Cx}$ can be set to determine when $LED_{ON}$, $LED_{BLINK}$ and $LED_{OFF}$ are activated or deactivated. In addition to the port LEDs, there are additional LEDs which indicate the status of the switch.

Registers 128 are located on switch 100 in this example of the present invention. Registers 128 are full registers that allow for configuration, status and Remote Monitoring (RMON) management. In this example, Registers 128 are arranged into groups and offsets. There are 32 address groups each of which can contain up to 64 registers.

Figure 2:
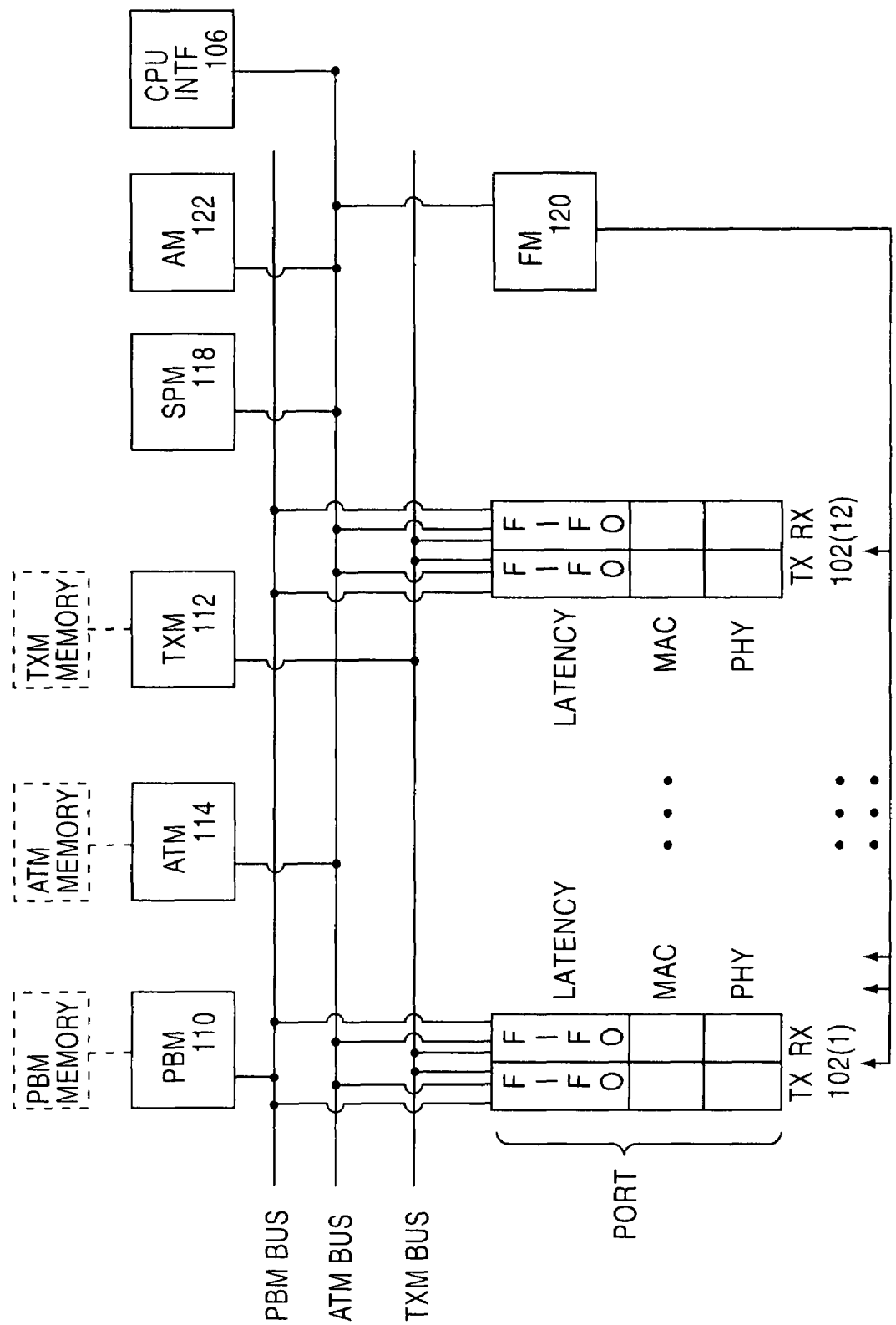
FIG. 2 illustrates the data flow on the CPS channel of a network switch according to the present invention.

FIG. 2 is an illustration of one embodiment of the invention having a PBM Bus, an ATM Bus, and a TXM Bus for communications with other portions of the switch. In this example PBM 110 is connected to the PBM Bus and an external PBM Memory; TXM 112 is connected to the TXM Bus and an external TXM Memory; and ATM 114 is connected to the ATM Bus and an external ATM Memory. Each of the transmit (TX) and receive (RX) portions of ports 102(1)-102(12) are connected to the PBM Bus, ATM Bus and TXM Bus for communications.

FM 120 is connected to each of the ports 102(1)-102(12) directly and is also connected to the ATM Bus for communications with other portions of the switch. SPM 118 and AM 122 are also connected to the ATM Bus for communications with other portions of the switch.

The operation of switch 100 for transmission of a unicast packet (i.e., a packet destined for a single port for output) in one example of the invention is made with reference to FIG. 2 as follows.

In this example, Switch 100 is initialized following the release of a hardware reset pin. A series of initialization steps will occur including the initialization of external buffer memory and the address table. All ports on the switch will then be disabled and the CPU will enable packet traffic by setting an enable register. As links become available on the ports (ports 102(1)-102(12) and gigabit port 104), an SPT protocol will confirm these ports and the ports will become activated. After the initialization process is concluded normal operation of Switch 100 can begin.

In this example, once a port has been initialized and activated, a PORT_ACTIVE command is issued by the CPU. This indicates that the port is ready to transmit and receive data packets. If for some reason a port goes down or becomes disabled, a PORT_INACTIVE command is issued by the CPU.

During unicast transmission, a packet from an external source on port 102(1) is received at the receive (RX) PHY of port 102(1).

In this example, the RX MAC of port 102(1) will not start processing the packet until a Start of Frame Delimiter (SFD) for the packet is detected. When the SFD is detected by the RX MAC portion of port 102(1), the RX MAC will place the packet into a receive (RX) FIFO of the latency block of port 102(1). As the RX FIFO becomes filled, port 102(1) will request an empty receive buffer from the SPM. Once access to the ATM Bus is granted, the RX FIFO Latency block of port 102(1) sends packets received in the RX FIFO to the external PBM Memory through the PBM Bus and PBM 110 until the end of packet is reached.

The PBM Memory, in this example, is made up of 256 byte buffers. Therefore, one packet may span several buffers within the packet buffer memory if the packet size is greater than 256 bytes. Connections between packet buffers can be maintained through a linked list system in one example of the present invention. A linked list system allows for efficient memory usage and minimized bandwidth overhead and will be explained in further detail with relation to FIG. 3A-FIG. 3D.

At the same time packets are being sent to the external PBM Memory, the port will also send the source address to Address Manager (AM) 122 and request a filtering table from AM 122.

If the packet is "good", as is determined through normal, standard procedures known to those of ordinary skill in the art, such as valid length and IEEE standard packet checking, such as a Cyclic Redundancy Check, the port writes the header information to the ATM memory through the ATM Bus and ATM 114. AM 122 sends a RECEP_COMPL command over the ATM Bus signifying that packet reception is complete. Other information is also sent along with the RECEP_COMPL command such as the start address and filtering table which indicates which ports the packet is to be sent out on. For example, a filtering table having a sting such as "011111111111" would send the packet to all ports except port 1 and would have a count of 11. The count simply is the number of ports the packet is to be sent to as indicated by the number of "1"s.

Forwarding Manager (FM) 120 is constantly monitoring the ATM Bus to determine if a RECEP_COMPL command has been issued. Once FM 120 has determined that a RECEP_COMPL command has been issued, Forwarding Manager (FM) 120 will use the filtering table to send packets to appropriate ports. It is noted that a packet will not be forwarded if one of the following conditions is met:
  a. The packet contains a CRC error
  b. The PHY signals a receive error
  c. The packet is less than a minimum threshold such as 64 bytes
  d. The packet is greater than a maximum threshold such as 1518 bytes or 1522 bytes depending on register settings
  e. The packet is only forwarded to the receiving port The RECEP_COMPL command includes information such as a filter table, a start pointer, priority information and other miscellaneous information. FM 120 will read the filter table to determine if the packet is to be transmitted from one of its ports. If it is determined that the packet is to be transmitted from one of its ports, FM 120 will send the RECEP_COMPL command information directly to the port. In this case, the RECEP_COMPL command information is sent to the TX FIFO of port 102(12).

If the port is busy, the RECEP_COMPL command information is transferred to TXM Memory through the TXM Bus and TXM 112. The TXM memory contains a queue of packets to be transmitted. TXM Memory is allocated on a per port basis so that if there are ten ports there are ten queues within the TXM Memory with one queue allocated to each port. As each of the ports transmitters becomes idle, each port will read the next RECEP_COMPL command information stored in the TXM Memory. The TX FIFO of port 102(12) will receive, as part of the RECEP_COMPL command information, a start pointer which will point to a header in ATM memory across the ATM Bus which in turn points to the location of a packet in the PBM Memory over the PBM Bus. The port will at this point request to load the packet into the transmit (TX) FIFO of port 102(12) and send it out through the MAC and PHY of port 102(12).

If the port is in half duplex mode, it is possible that a collision could occur and force the packet transmission to start over. If this occurs, the port simply re-requests the bus master and reloads the packet and starts over again. If however, the number of consecutive collisions becomes excessive, the packet will be dropped from the transmission queue.

Once the port successfully transmits a packet, the port will signal FM 120 that it is done with the current buffer. FM 120 will then decrement a counter which indicates how many more ports must transmit the packet. For example, if a packet is destined to eleven ports for output, the counter, in this example, is set to 11. Each time a packet is successfully transmitted, FM 120 decrements the counter by one. When the counter reaches zero this will indicate that all designated ports have successfully transmitted the packet. FM 120 will then issue a FREE command over the ATM Bus indicating that the memory occupied by the packet in the PBM Memory is no longer needed and can now be freed for other use.

When SPM 118 detects a FREE command over the ATM Bus, steps are taken to indicate that the space taken by the packet is now free memory.

Multicast and broadcast packets are handled exactly like unicast packets with the exception that their filter tables will indicate that all or most ports should transmit the packet. This will force the forwarding managers to transmit the packet out on all or most of their ports.

Figure 3A:
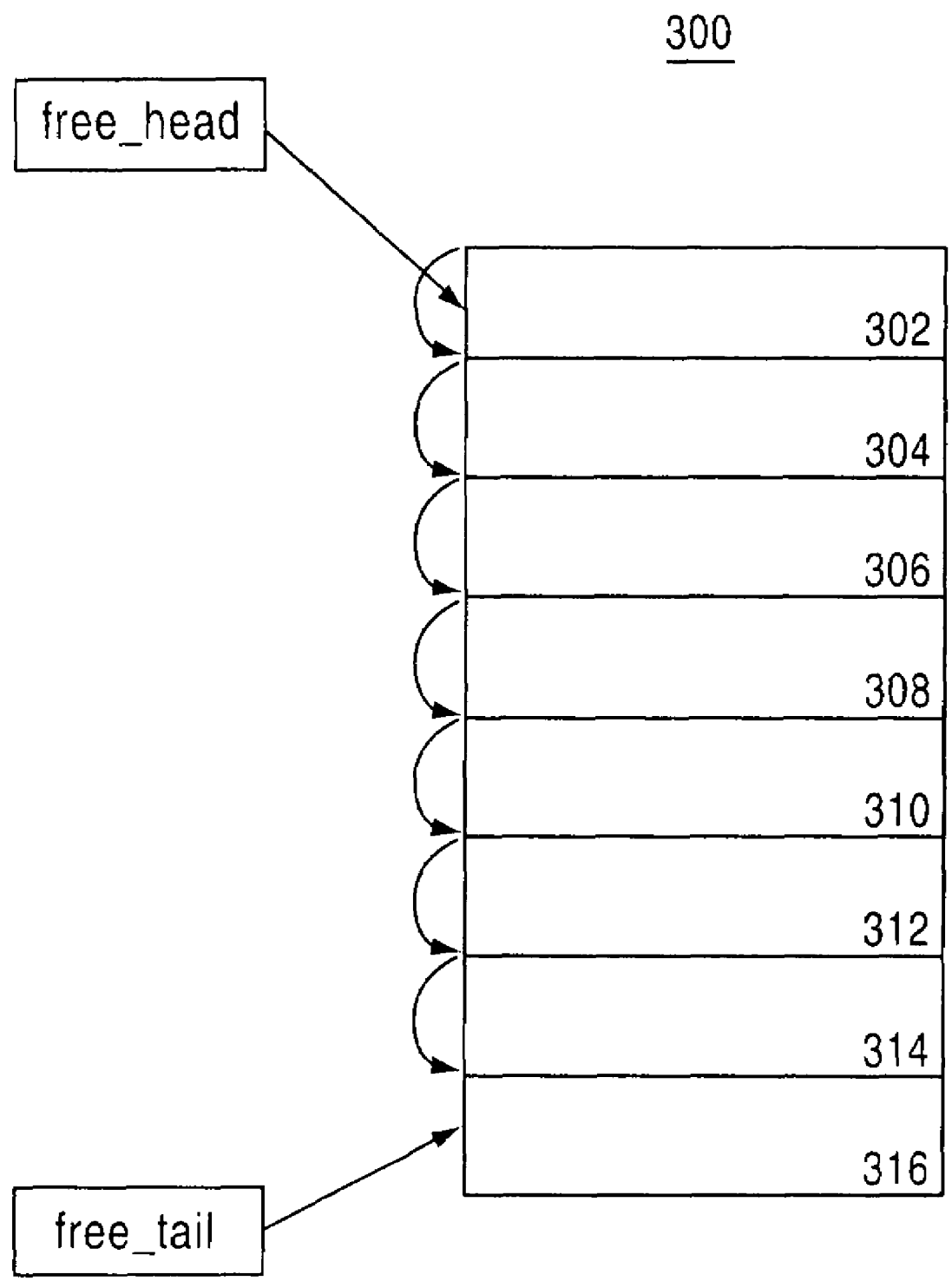
FIG. 3A illustrates a linked list structure of Packet Buffer Memory.

FIG. 3A is an illustration of a PBM Memory structure in one example of the invention. PBM Memory Structure 300 is a linked list of 256 byte segments 302, 304, 306, 308, 310, 312, 314 and 316. In this example segment 302 is the free_head indicating the beginning of the free memory linked list and segment 316 is the free_tail indicating the last segment of free memory.

Figure 3B:
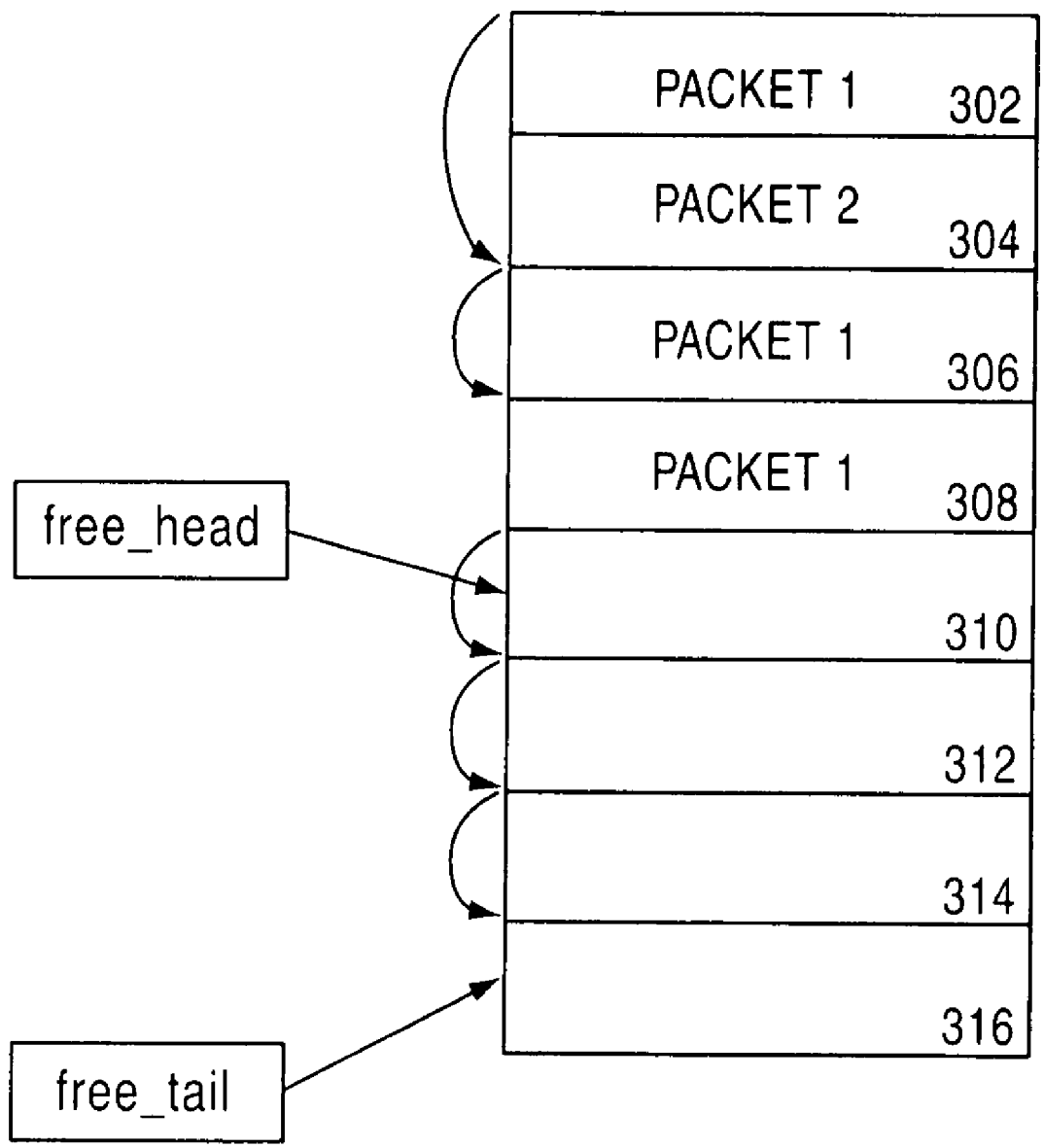
FIG. 3B illustrates a linked list structure of Packet Buffer Memory with two data packets.

In FIG. 3B two packets have been received and stored in the PBM Memory. Packet 1 occupies segments 302, 306 and 308 and packet 2 occupies segment 304. Segments 310, 312, 314 and 316 are free memory. Segment 310 is the free_head indicating the beginning of free memory and segment 316 is the free_tail indicating the end of free memory.

Figure 3C:
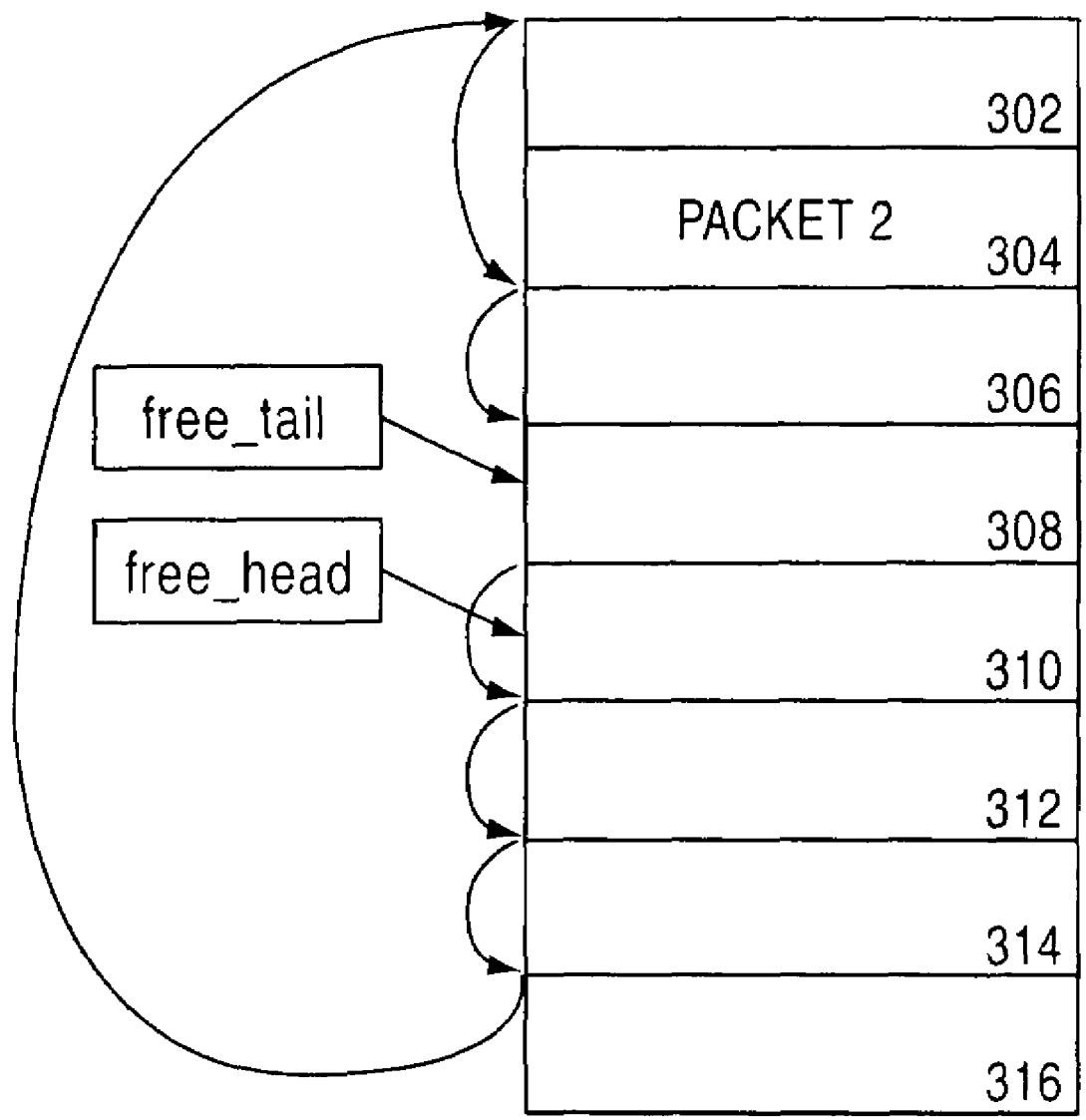
FIG. 3C illustrates a linked list structure of Packet Buffer Memory after the memory occupied by one data packet is freed.

In FIG. 3C packet 1 has been fully transmitted and the Forwarding Manager (FM) has issued a FREE command. Since packet 1 is already in a linked list format the SPM can add the memory occupied by packet 1 to the free memory linked list. The free_head, segment 310 remains the same. However, the free_tail is changed. This is accomplished by linking segment 316 to the beginning of packet 1, which is segment 302, and designating the last segment of packet 1, which is segment 308, as the free_tail. As a result, there is a linked list starting with segment 310 linking to segment 312, segment 312 linking to segment 314, segment 314 linking to segment 316, segment 316 linking to segment 302, segment 302 linking to segment 306 and segment 306 linking to segment 308 where segment 308 is the free—tail.

Figure 3D:
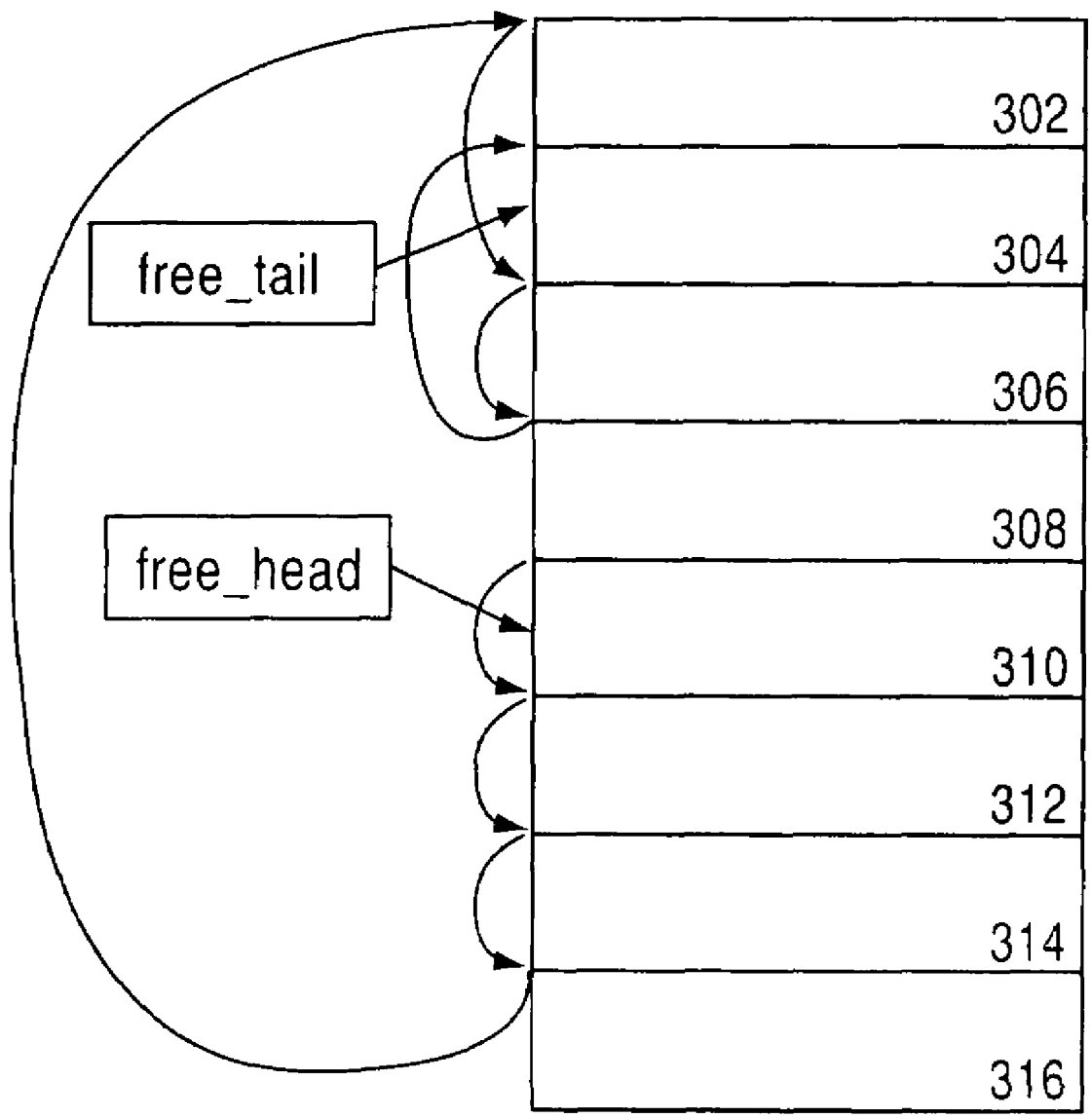
FIG. 3D illustrates a linked list structure of Packet Buffer Memory after the memory occupied by another data packet is freed.

FIG. 3D in this example simply illustrates the PBM Memory after packet 2 has been transmitted successfully and the Forwarding Manager has issued a FREE command over the ATM Bus. The SPM will detect the FREE command and then add the memory space occupied by packet 2 in the PBM Memory to the free memory linked list. In this example segment 308 is linked to the memory occupied by packet 2, segment 304, and segment 304 is identified as the free_tail.

Figure 4:
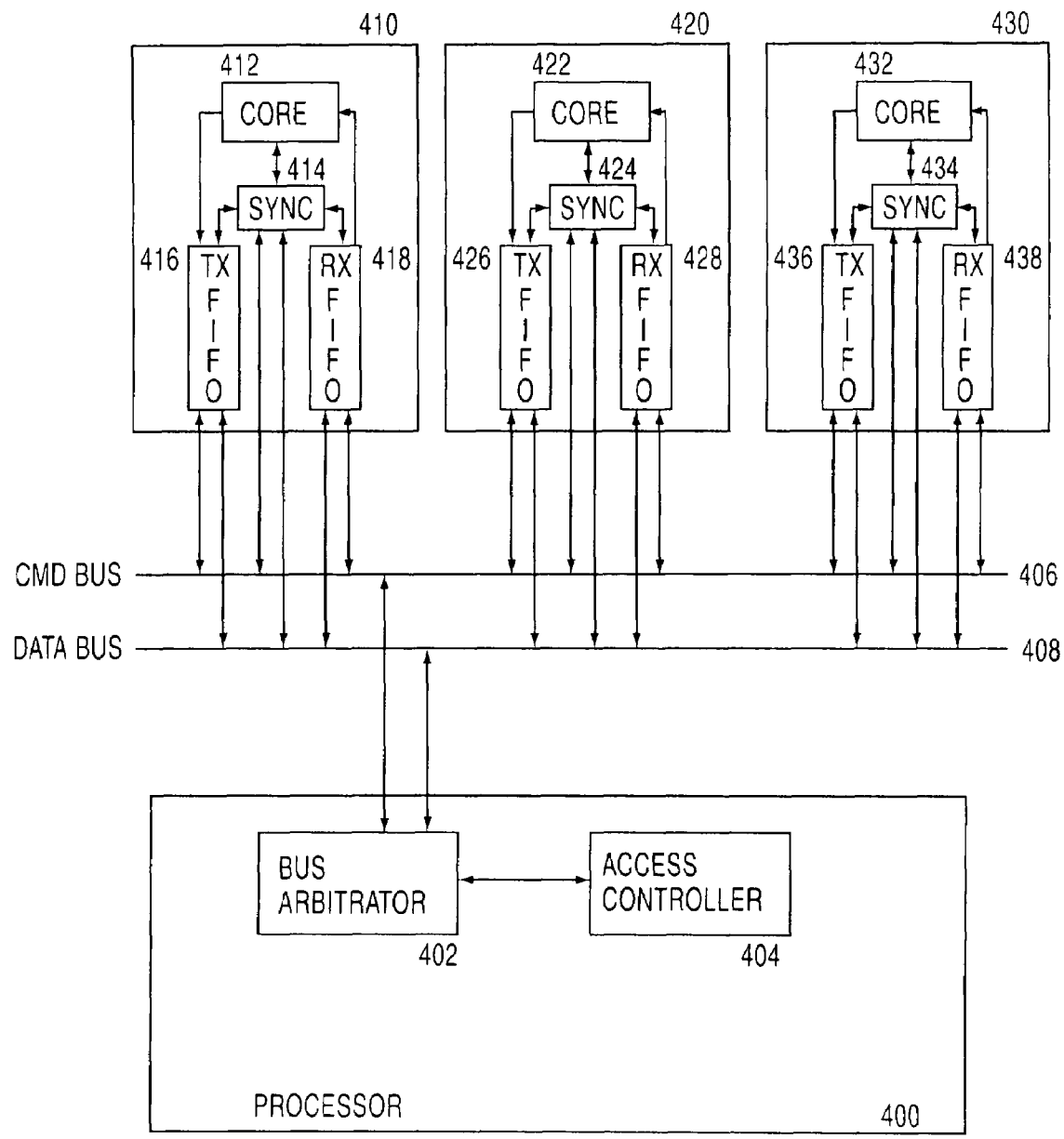
FIG. 4 is a block diagram of a processor having multiple clients.

FIG. 4 is an illustration of one embodiment of the invention. In this embodiment, a processor 400 has a bus arbitrator 402 and an access controller 404. Arbitrator 402 is in communication with access controller 404. Arbitrator 402 manages command and data traffic within processor 400 and also manages commands and data traffic external of processor 400. Access controller 404 receives data and commands from bus arbitrator 402 and processes these commands and data at a processor clock speed.

A command bus, CMD Bus 406, and a data bus 408 are provided for communication and transmission of commands and data. Arbitrator 402 is in communication with CMD Bus 406 and data bus 408. In one embodiment of the invention there are three client systems that operate at a core clock speed. The first client system 410 has a core 412, a sync 414, a transmit FIFO 416 and a receive FIFO 418. Core 412 can be the basic circuitry for a network switch to transmit and receive data. Sync 414 can synchronize the processor clock speed with the core clock speed to transmit signals between each of the cores and the processor.

Core 412 is in communication with a sync 414, a transmit FIFO 416 and a receive FIFO 418. Sync 414 is in communication with transmit FIFO 416 and receive FIFO 418. Sync 414 is also in communication with CMD Bus 406 and data bus 408. Transmit FIFO 416 is in communication with CMD Bus 406 and data bus 408, and receive FIFO 418 is also in communication with CMD Bus 406 and data bus 408.

Similarly, client systems 420 and 430 are arranged identical to client system 410. Client system 420 has a core 422, a sync 424, a transmit FIFO 426 and a receive FIFO 428. The interconnections between core 422, sync 424, transmit FIFO 426, receive FIFO 428, CMD Bus 406 and data bus 408 are identical to those as described with relation to client system 410.

Similarly, client system 430 has a core 432, a sync 434, a transmit FIFO 436 and a receive FIFO 438. The interconnections between core 432, sync 424, transmit FIFO 436, receive FIFO 438, CMD Bus 406 and data bus 408 are identical to those as described with respect to client systems 410 and 420.

Core 412, core 422 and core 432 can be the basic circuitry for a network switch. Receive FIFO 418 can be used as a receive buffer to receive signals over CMD Bus 406 and data bus 408 from processor 400 at a first clock speed. When receive FIFO 418 receives a signal at a first clock speed, namely, the processor clock speed, sync 414 will hold CMD Bus 406 and data bus 408. The signal received in the receive FIFO 418 will then be transmitted to core 412 at a second clock speed, which can be a slower clock speed at which core 412 operates.

Core 412 will receive the signal from the receive FIFO 418 at the second, core clock speed and process the signal at the second, core clock speed. When the core is finished processing the signal and the signal is to be transmitted to the processor, core 412 can transmit the signal at the second core clock speed to transmit FIFO 416. Transmit FIFO 416 can receive the signal processed by core 412 at the second core clock speed and hold the signal in the transmit FIFO 416 as a buffer. The transmit FIFO 416 can then transmit the signal received from core 412 across CMD Bus 406 and/or data bus 408 to be sent to processor 400 at the processor clock speed. Arbitrator 402 can then receive the signal over the CMD Bus 406 and/or data bus 408 for further processing.

Upon completion of the transmission of the signal from the transmit FIFO 416 to processor 400, sync 414 can release the CMD Bus 406 and/or data bus 408. Arbitrator 402 will then receive the signal from the client 410 and will transmit the signal to access controller 404 for further processing.

From the above description, it is evident that processor 400 will take requests and commands to access a client's data. Thus, arbitrator 402 will manage the command and data traffic between processor 400 and its clients 410, 420 and 430. Access controller 404 can then take these commands and data for further processing by processor 400.

The core for each of the clients is responsible for issuing commands and data to processor 400 and also for accepting manipulated data from processor 400. Since the processor 400 and each of the cores 412, 422 and 432 operate at different clock speeds, each client is provided with a transmit FIFO and a receive FIFO to buffer the data. In the case of client 410, the transmit FIFO 416 and a receive FIFO 418 are provided. In the case of client 420, a transmit FIFO 426 and a receive FIFO 428 are provided. In the case of client 430, a transmit FIFO 436 and a receive FIFO 438 are provided.

One of the FIFOs (receive FIFO 418, receive FIFO 428, receive FIFO 438) is for the ingress and the other FIFO (transmit FIFO 416, transmit FIFO 426, transmit FIFO 436) is for the egress.

Each of the syncs 414, 424 and 434 play an important role in the present invention. Syncs 414, 424 and 434 synchronize the request signal from the clock domain of the cores 412, 422 and 432 to the clock domain of the processor 400. At the same time the core requests commands from the processor, data must also be ready to be accessed. Once processor 400 grants the bus to the client, the processor can drive command and data at the clock speed of processor 400. After data processing is complete, processor 400 will send manipulated data to the client that requested the data. Each of the sync blocks 414, 424 and 434 will latch the manipulated data at the clock speed of the processor and will hold the data long enough to write the data to the egress FIFO (transmit FIFO 416, transmit FIFO 426, transmit FIFO 436) at the clock speed of the core.

When the entire process is complete, processor 400 can then serve other clients. The advantage of the invention as described above is that only a few signals will need to be synchronized which will achieve reduced clock speed on the core of each client. This will also reduce engineering efforts for asynchronous FIFO and controller design.

Figure 5:
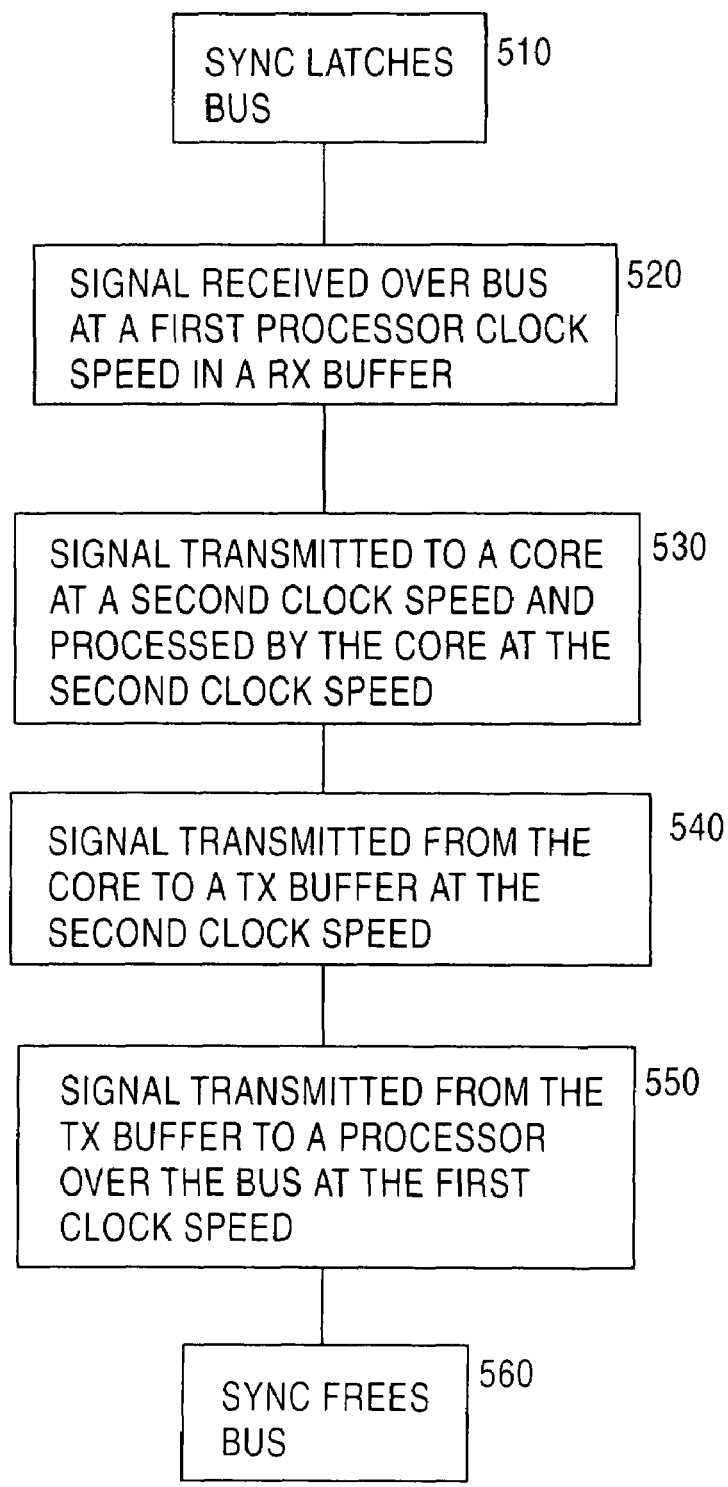
FIG. 5 is a flow diagram of method steps in one embodiment of the invention.

FIG. 5 is a flow chart which illustrates another embodiment of the invention. In this embodiment, in step 510, sync 414 latches a bus (command bus 406 and/or data bus 408). In step 520 a signal is received over the bus at a first processor clock speed in receive buffer, RX FIFO 418. In step 530, the signal is transmitted from the receive FIFO 418 to core 412 at a second clock speed (core clock speed) and processed by the core at the second core clock speed.

In step 540, the signal is transmitted from the core to transmit FIFO 416 at the second core clock speed. The signals are transmitted from the transmit FIFO 416 to processor 400 over the bus at the first processor clock speed in step 550 and in step 560, sync 414 frees the bus and allows processor 400 to serve other clients.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

We claim:

1. A system, comprising:
    a sync configured to allow signals to be received in a receive buffer of a core at a first clock speed and to allow signals to be transmitted from a transmit buffer of the core at a second clock speed, the second clock speed being different than the first clock speed and the sync being in communication with said transmit buffer and said receive buffer,
    wherein the sync is configured to be in communication with at least one of a command bus or a data bus of the core, and
    wherein the signals in the receive buffer and the signals in the transmit buffer are stored in respective linked lists.

2. The system of claim 1, wherein said transmit buffer comprises a transmit FIFO.

3. The system of claim 1, wherein said receive buffer comprises a receive FIFO.

4. The system of claim 1, wherein said signals comprise command signals.

5. The system of claim 1, wherein said signals comprise data signals.

6. The system of claim 1, wherein said sync is further configured to latch said signals at said second clock speed and to hold said signals long enough to allow said core to transmit said signals to said transmit buffer at said first clock speed.

7. The system of claim 1, further comprising:
    a processor in communication with said command bus and said data bus, said processor including:
        a bus arbitrator in communication with said command bus and said data bus to receive, transmit and manage signals transferred along said command bus and said data bus; and
        an access controller in communication with said bus arbitrator to process said signals,
    wherein the command bus is in communication with said sync and the data bus is in communication with said sync.

8. A method for syncing two clock speeds, said method comprising:
    receiving a signal in a receive buffer from a command bus or a data bus in communication therewith at a first clock speed using a sync that is in communication with a core;
    storing said received signal in a linked list in said receive buffer;
    transmitting said signal from said receive buffer to a core at a second clock speed said second clock speed being different than said first clock speed;
    transmitting said signal from said core to a transmit buffer at said second clock speed;
    storing said signal in a linked list in said transmit buffer; and
    transmitting said signal from said transmit buffer onto the command bus or the data bus at said first clock speed using said sync.

9. The method of claim 8, wherein receiving said signal in a receive buffer comprises receiving the signal in a receive FIFO.

10. The method of claim 8, wherein transmitting said signal to a transmit buffer comprises transmitting said signal to a transmit FIFO.

11. The method of claim 8, wherein receiving said signal comprises the step of receiving command signals.

12. The method of claim 8, wherein receiving said signal comprises receiving data signals.

13. The method of claim 8, further comprising holding said signal using said sync, which latches said signal at said first clock speed and holds said signal long enough to allow said core to transmit said signal to said transmit buffer at said second clock speed.

14. A system for syncing two clock speeds, said system comprising:
    a signal receiving means for receiving a signal in a receive buffer at a first clock speed using a sync from a data or command bus, the received signal being stored in a linked list in said receive buffer;
    a core transmitting means for transmitting said signal from said receive buffer to a core at a second clock speed, said second clock speed being different than said first clock speed;
    a transmit buffer transmitting means for transmitting said signal from said core to a transmit buffer at said second clock speed, said signal being stored in a linked list in said transmit buffer; and
    a processor transmitting means for transmitting said signal from said transmit buffer back onto said data or command bus at said first clock speed using said sync.

15. The system of claim 14, wherein said signal receiving means is configured to receive said signal in a receive FIFO.

16. The system of claim 14, wherein said transmit buffer transmitting means is configured to transmit said signal to a transmit FIFO.

17. The system of claim 14, wherein said signal receiving means is configured to receive command signals.

18. The system of claim 14, wherein said signal receiving means is configured to receive data signals.

19. The system of claim 18, further comprising:
    a holding means for holding said signals using said sync, which latches said signals at said first clock speed and holds said signals long enough to allow said core to transmit said signals to said transmit buffer at said second clock speed.

20. The system of claim 14 further comprising:
    a holding means for holding said signals using said sync, which latches said signals at said first clock speed and holds said signals long enough to allow said core to transmit said signal to said transmit buffer at said second clock speed.

* * * * *